United States Patent
Fagan et al.

(10) Patent No.: US 7,337,544 B2
(45) Date of Patent: Mar. 4, 2008

(54) METHOD OF FORMING A COMPOSITE DOOR STRUCTURE

(75) Inventors: Gary Fagan, Charlotte, NC (US); Richard H. Kon, Cornelius, NC (US)

(73) Assignee: Masonite International Corporation, Mississauga, Ontario (CA)

(*) Notice: Subject to any disclaimer, the term of this patent is extended or adjusted under 35 U.S.C. 154(b) by 0 days.

(21) Appl. No.: 11/653,285

(22) Filed: Jan. 16, 2007

(65) Prior Publication Data

US 2007/0119114 A1    May 31, 2007

Related U.S. Application Data

(62) Division of application No. 10/183,998, filed on Jun. 28, 2002, now Pat. No. 7,178,308.

(51) Int. Cl.
*B23P 17/00* (2006.01)
(52) U.S. Cl. .............. 29/897.32; 29/458; 29/463; 29/469.5; 29/527.1; 29/527.2; 52/784.1; 52/309.13
(58) Field of Classification Search .......... 29/428, 29/525.14, 557, 558, 458, 527.1, 527.2, 469.5, 29/897.32, 463; 52/784.1, 742.12, 309.13, 52/309.14, 800.1, 743.1
See application file for complete search history.

(56) References Cited

U.S. PATENT DOCUMENTS

| | | |
|---|---|---|
| 3,233,013 A | 2/1966 | Von Jaeger |
| 3,328,281 A | 6/1967 | Kato |
| 3,334,464 A | 8/1967 | Charles |
| 3,403,205 A | 9/1968 | Ottenholm et al. |
| 3,486,919 A | 12/1969 | Dreazy et al. |
| 3,634,986 A | 1/1972 | Ford et al. |
| 3,699,202 A | 10/1972 | Verbestel |
| 3,765,934 A | 10/1973 | Gaylord |
| 3,790,421 A | 2/1974 | Habgood, Jr. |
| 3,899,860 A | 8/1975 | Newell |
| 3,936,518 A | 2/1976 | Soda et al. |
| 3,958,069 A | 5/1976 | Gaylord |
| 4,004,774 A | 1/1977 | Houston |
| 4,091,153 A | 5/1978 | Holman |
| 4,141,944 A | 2/1979 | Anstadt et al. |
| 4,183,977 A | 1/1980 | Burkey et al. |
| 4,228,116 A | 10/1980 | Colombo et al. |
| 4,236,365 A | 12/1980 | Wheeler |

(Continued)

FOREIGN PATENT DOCUMENTS

WO    WO00/04249    1/2000

*Primary Examiner*—Jermie E. Cozart
(74) *Attorney, Agent, or Firm*—Berenato, White & Stavish

(57) ABSTRACT

A method of forming a composite door is disclosed. The method comprises: mixing together a thermoplastic polymer with an organic fibrous material in a ratio such that the organic fibrous material constitutes 40 to 60 percent by weight of the mixture; extruding the mixture under heat and pressure to create a thin sheet form; cutting the sheet to a predetermined size; removing material from at least one surface of the sheet to create a homogeneous appearance devoid of obvious fibrous particles; thermoforming the sheet to impart to the at least one surface an exterior three dimensional door surface to create a thin door facing; and assembling two of the thermoformed thin door facings, a peripheral frame and a core material into a door.

39 Claims, 2 Drawing Sheets

U.S. PATENT DOCUMENTS

| | | |
|---|---|---|
| 4,265,067 A | 5/1981 | Palmer |
| 4,324,748 A | 4/1982 | Hatakeyama et al. |
| 4,358,418 A | 11/1982 | Heggenstaller |
| 4,359,507 A | 11/1982 | Gaul et al. |
| 4,361,530 A | 11/1982 | Peer |
| 4,409,293 A | 10/1983 | Williams |
| 4,414,267 A | 11/1983 | Coran et al. |
| 4,420,351 A | 12/1983 | Lussi et al. |
| 4,425,126 A | 1/1984 | Butterworth et al. |
| 4,468,361 A | 8/1984 | Exner et al. |
| 4,505,869 A | 3/1985 | Nishibori |
| 4,517,228 A | 5/1985 | Matejka et al. |
| 4,546,039 A | 10/1985 | Horacek et al. |
| 4,550,540 A | 11/1985 | Thorn |
| 4,610,900 A | 9/1986 | Nishibori |
| 4,620,892 A | 11/1986 | Dodson et al. |
| 4,624,976 A | 11/1986 | Amano et al. |
| 4,643,787 A | 2/1987 | Godman |
| 4,686,251 A | 8/1987 | Ostermann et al. |
| 4,735,851 A | 4/1988 | Dodson et al. |
| 4,791,020 A | 12/1988 | Kokta |
| 4,813,990 A | 3/1989 | Thorn |
| 4,814,213 A | 3/1989 | Thorn |
| 4,818,604 A | 4/1989 | Tock |
| 4,844,850 A | 7/1989 | Harder |
| 4,850,168 A | 7/1989 | Thorn |
| 4,860,512 A | 8/1989 | Thorn |
| 4,864,789 A | 9/1989 | Thorn |
| 4,870,797 A | 10/1989 | Hagemeyer |
| 4,901,493 A | 2/1990 | Thorn |
| 4,922,674 A | 5/1990 | Thorn |
| 4,965,030 A | 10/1990 | Thorn |
| 4,976,905 A | 12/1990 | Brown |
| 5,003,745 A | 4/1991 | Fang |
| 5,055,247 A | 10/1991 | Ueda et al. |
| 5,074,087 A | 12/1991 | Green |
| 5,077,948 A | 1/1992 | Olson et al. |
| 5,082,605 A | 1/1992 | Brooks et al. |
| 5,088,910 A | 2/1992 | Goforth et al. |
| 5,093,058 A | 3/1992 | Harmon et al. |
| 5,096,046 A | 3/1992 | Goforth et al. |
| 5,142,835 A | 9/1992 | Mrocca |
| 5,151,238 A | 9/1992 | Earl et al. |
| 5,161,346 A | 11/1992 | Olson et al. |
| 5,175,970 A | 1/1993 | Green |
| 5,217,655 A | 6/1993 | Schmidt |
| 5,252,640 A | 10/1993 | Cope |
| 5,296,176 A | 3/1994 | Nakamura |
| 5,323,971 A | 6/1994 | Nishibori et al. |
| 5,332,602 A | 7/1994 | Barre et al. |
| 5,334,633 A | 8/1994 | Cope |
| 5,355,654 A | 10/1994 | Stanley |
| 5,369,869 A * | 12/1994 | Bies et al. .............. 29/460 |
| 5,391,340 A | 2/1995 | Mirous et al. |
| 5,413,746 A | 5/1995 | Birjukov |
| 5,413,814 A | 5/1995 | Bowen et al. |
| 5,417,904 A | 5/1995 | Razi et al. |
| 5,441,801 A | 8/1995 | Deaner et al. |
| 5,486,553 A | 1/1996 | Deaner et al. |
| 5,496,648 A | 3/1996 | Held |
| 5,516,472 A | 5/1996 | Laver |
| 5,537,789 A | 7/1996 | Minke et al. |
| 5,539,027 A | 7/1996 | Deaner et al. |
| 5,593,625 A | 1/1997 | Riebel et al. |
| 5,620,642 A | 4/1997 | Kamite et al. |
| 5,629,083 A | 5/1997 | Teodorczyk |
| 5,634,508 A | 6/1997 | Herbst |
| 5,635,123 A | 6/1997 | Riebel et al. |
| 5,695,874 A | 12/1997 | Deaner et al. |
| 5,700,555 A | 12/1997 | Grill |
| 5,725,939 A | 3/1998 | Nishibori |
| 5,759,680 A | 6/1998 | Brooks et al. |
| 5,771,656 A | 6/1998 | Amoretti |
| 5,773,138 A | 6/1998 | Seethamraju et al. |
| 5,782,055 A | 7/1998 | Crittenden |
| 5,801,205 A | 9/1998 | Nishibori et al. |
| 5,824,246 A | 10/1998 | Reetz |
| 5,827,607 A | 10/1998 | Deaner et al. |
| 5,852,910 A | 12/1998 | Zebedee |
| 5,858,522 A | 1/1999 | Turk et al. |
| 5,866,264 A | 2/1999 | Zehner et al. |
| 5,869,138 A | 2/1999 | Nishibori |
| 5,883,025 A | 3/1999 | Karstens et al. |
| 5,887,402 A | 3/1999 | Ruggie et al. |
| RE36,240 E | 6/1999 | Minke et al. |
| 5,932,314 A | 8/1999 | West |
| 5,932,334 A | 8/1999 | Deaner et al. |
| 5,934,030 A | 8/1999 | McDonald |
| 5,934,040 A | 8/1999 | Chen |
| 5,943,825 A | 8/1999 | Procton et al. |
| 5,948,524 A | 9/1999 | Seethamraju et al. |
| 5,948,849 A | 9/1999 | Porter |
| 5,950,382 A | 9/1999 | Martino |
| 5,961,054 A | 10/1999 | Nishibori |
| 5,965,207 A | 10/1999 | Kropfeld et al. |
| 5,981,067 A | 11/1999 | Seethamraju et al. |
| 6,004,668 A | 12/1999 | Deaner et al. |
| 6,011,091 A | 1/2000 | Zehner |
| 6,015,611 A | 1/2000 | Deaner et al. |
| 6,015,612 A | 1/2000 | Deaner et al. |
| 6,024,908 A | 2/2000 | Koncelik |
| 6,030,562 A | 2/2000 | Lehtinen et al. |
| 6,066,278 A | 5/2000 | Got et al. |
| 6,066,367 A | 5/2000 | Nishibori |
| 6,073,419 A | 6/2000 | Moyes |
| 6,079,183 A | 6/2000 | Moyes |
| 6,092,343 A | 7/2000 | West et al. |
| 6,098,368 A | 8/2000 | McKann |
| 6,117,924 A | 9/2000 | Brandt |
| 6,120,852 A | 9/2000 | Porter |
| 6,132,540 A | 10/2000 | Barber et al. |
| 6,139,179 A | 10/2000 | Christiano et al. |
| 6,151,849 A | 11/2000 | Twigg et al. |
| 6,161,363 A | 12/2000 | Herbst |
| 6,165,308 A | 12/2000 | Chen et al. |
| 6,170,224 B1 | 1/2001 | Boyse et al. |
| 6,180,257 B1 | 1/2001 | Brandt et al. |
| 6,201,057 B1 | 3/2001 | Porter |
| 6,210,792 B1 | 4/2001 | Seethamraju et al. |
| 6,758,996 B2 | 7/2004 | Monovoukas et al. |
| 2003/0084639 A1* | 5/2003 | Wang Chen .............. 52/784.1 |

* cited by examiner

METHOD OF FORMING A COMPOSITE DOOR STRUCTURE

CROSS REFERENCE TO RELATED APPLICATION

This is a divisional of patent application Ser. No. 10/183,998 filed Jun. 28, 2002, now U.S. Pat. No. 7,178,308 and claims the benefit of priority thereof under 35 U.S.C § 120.

FIELD OF THE INVENTION

The present invention relates to the formation of doors. In particular, the present invention relates to the formation of a door from a composite of a thermoplastic material and an organic fibrous material.

BACKGROUND OF THE INVENTION

Various materials are used to construct architectural doors. Architectural wood doors are well known. Wood doors, however, when exposed to rain, snow, sun and other elements require frequent maintenance including the application of various stains and clear coats. Wood doors can also warp and are subject to rot. There is a need for a door having low maintenance that is not susceptible to the elements. Various alternatives to wood are available.

Doors having steel facing panels are common. These steel panel doors are fairly inexpensive to construct and are somewhat dimensionally stable under temperature fluctuations. The initial start up costs associated with producing a steel door is high. High pressure tools are required to form the panels. However, unless the steel panels used have a high thickness, doors constructed with steel panels are subject to denting. In addition, imparting a crisp multi-directional wood grain appearance to a steel panel door is typically not done.

Doors constructed with fiberglass facing panels are also common. Fiberglass facing panels have significant benefits over steel. Fiberglass facing panels can be constructed to resemble a panelized wooden door. However, fiberglass doors are very expensive to construct. Like steel doors, the start-up costs associated with production are high and production rates are very slow. Expensive molds must be used to produce the panels having a panelized wooden door appearance. The raw materials for fiberglass doors are also relatively expensive. Fiberglass doors also have problems with dimensional stability resulting from temperature fluctuations. Such dimensional stability can eventually damage a door.

Doors constructed with PVC facing panels are also well known. PVC facing panels are less expensive to produce than the fiberglass panels as manufacturing costs and raw material costs are both less than that of fiberglass panels. However, PVC, like fiberglass, is dimensionally unstable in response to temperature fluctuations. PVC softens considerably at 180° F. As a result, PVC is inappropriate for use in storm doors and doors that are used in combination with storm doors where it is possible to obtain temperatures in excess of 180° F. in the space between the storm door and the door in response to exposure to direct sunlight. For example, the space between a dark painted door and a full view storm door (i.e., large window) can reach up to 230° F. and 240° F. Consequently many materials undergo considerable deterioration when used on an exterior door used in association with a storm door or used as a storm door.

For the foregoing reasons there is a need for a door constructed with opposing door panels that are manufactured using inexpensive manufacturing techniques and inexpensive raw materials. There is a further need for doors constructed with door panels that are resistant to denting and are dimensionally stable under temperature fluctuations.

Others have tried to use produce composite materials. These materials, however, are not suitable for use in the formation of composite door skins from both manufacturing and product lifetime perspectives.

U.S. Pat. Nos. 5,486,553 and 5,539,027, both entitled "Advanced Polymer/Wood Composite Structural Member" to Deaner et al. disclose the formation of structural members from a polymer and wood composite. The structural members are formed from a composite containing 30 to 50 wt-% of sawdust along with 50 to 70 wt-% of a polyvinyl chloride polymer. The composite is first blended and then extruded into pellets. The pellets are then extruded into the desired structural member. The disclosed composite, however, is not suitable for use in the formation of doors because the material may degrade when exposed to high temperatures. Furthermore, the use of the disclosed composite requires additional manufacturing steps. Furthermore, the composite must first be pelletized before formation into the final shape as a structural member. Finally, the final product does not have the appearance of wood.

U.S. Pat. No. 5,700,555, entitled "Sandable and Stainable Plastic/Wood Composite" to Grill discloses a composite article that may be used to form components of steel, fiberglass or wood door. The article includes a first zone made entirely of plastic and a second zone made of plastic and natural fiber. The first and second zones are integral and are continuously coextruded. The ratio of natural fiber in the second zone is between 10% and 55%. The outer surface of the second zone includes embossing to resemble wood grain. The outer surface has sufficient porosity so as to hold and retain wood stain and paint so that the composite article is stainable to resemble genuine wood. The composition of the second zone may include between 45% and 90% polyvinylchloride, between 10% and 55% natural fiber, and external lubricate and a fusion enhancer.

U.S. Pat. Nos. 5,827,607, 5,932,334, and 6,015,611, each entitled "Advanced Polymer Wood Composite" to Deaner et al. and U.S. Pat. No. 6,015,612, entitled "Polymer Wood Composite" to Deaner et al. disclose the formation of structural members from a polymer and wood composite. The structural members are formed from a composite containing 30 to 50 wt-% of sawdust along with 40 to 70 wt-% of a polymer containing vinyl chloride and less than 8 wt-% of water. Like the other Deaner et al. references discussed above, the composite is first blended and then extruded into pellets. The pellets are then extruded into the desired structural member, which requires additional manufacturing steps.

U.S. Pat. No. 5,866,264, entitled "Renewable Surface For Extruded Synthetic Wood Material" to Zehner et al discloses a cellulosic fibrous polymer composite material having a renewable surface that is coextruded therewith.

U.S. Pat. No. 5,869,138, entitled "Method For Forming Pattern On A Synthetic Wood Board" to Nishibori discloses a method of forming a wood grain pattern on a synthetic wood board. Nishibori discloses a multi-step process for forming a wood grain. The synthetic wood board is first subject to a first grinding process along its entire surface of at least one side. A colorant is then coated on the ground surface. The colorant impregnates in wood meal on the surface. The surface is then subject to a second grinding process and abraded to form woody like appearance. The board is then subject to a grain printing process.

OBJECTS OF THE INVENTION

It is an object of the present invention to provide a composite door structure using an organic fibrous material.

It is another object of the present invention to provide a composite door structure formed from a mixture of a thermoplastic polymer and an organic fibrous material.

It is another object of the present invention to provide a composite door structure having the appearance of wood It is another object of the present invention to provide a composite door structure formed from a mixture of a thermoplastic polymer, an organic fibrous material and a coupling agent.

It is another object of the present invention to provide a composite door structure having a smooth appearance similar to steel.

It is another object of the present invention to provide a composite door structure having improved thermal properties to withstand exposure to increased temperatures.

It is another object of the present invention to provide a composite door structure having improved dent impact resistance over steel.

It is another object of the present invention to provide a composite door structure that is easy to stain or paint.

It is another object of the present invention to provide a composite door structure having improved maintenance qualities and is not susceptible to rot.

It is another object of the present invention to provide a method of forming a composite door structure.

SUMMARY OF THE INVENTION

The present invention provides a method of forming a door. The present invention is also directed to a door constructed in accordance with the method of forming a door. The method includes mixing together a thermoplastic polymer with an organic fibrous material in a ratio such that the organic fibrous material constitutes 40 to 60 percent by weight of the mixture. The mixture may also include a coupling agent, such as for example, a maleated polypropylene. It is contemplated that the coupling agent may constitute 0.5 to 5 percent by weight off the mixture. It is further contemplated that the mixture may include one or more impact modifiers. The impact modifiers improve resistance to dents. The mixture is then extruded under heat and pressure to create a thin sheet form. The sheet is then cut to a predetermined size. Material from at least one surface of the sheet may be partially removed to create a homogeneous appearance devoid of obvious fibrous particles. The surface may be sanded, abraded or treaded. The sheet is then thermoformed to impart on at least one surface an exterior three dimensional door surface to create a thin door facing. The thermoformed sheets may have the appearance of a door facing having raised panels or other suitable textured surface. It is also contemplated that the thermoformed sheets may have a smooth flat surface. It is also contemplated that the surface of the sheet not be treated prior to the thermoforming operation. The surface of the facings has a suitable finish such that painting or staining is unnecessary. The two thermoformed thin door facings, a peripheral frame and a core material are assembled into a door in which the two thin door facings are fixedly held in parallel relation by the peripheral frame and core material with the first surfaces of each thin door facing thereof facing outwardly in opposite directions.

The method of forming a door of the present invention provides significant benefits over the prior art. The method of forming a door of the present invention is inexpensive because the materials used to manufacture the door facings are inexpensive and the manufacturing techniques used to manufacture the door facings are inexpensive to perform. Specifically, the materials used to manufacture the sheets from which the door facings are manufactured comprise a mixture of thermoplastic polymer and organic fibrous material. The organic fibrous material preferably constitutes 40-60% by weight of the mixture. The mixture may also include a coupling agent. It is contemplated that the coupling agent may constitute 0.5 to 5 percent by weight off the mixture. The organic fibrous material preferably comprises relatively small particles of pine, other suitable inexpensive woods or other fibrous organic materials including but not limited to straw, rice husks and knaff. The organic fibrous material may often be a by-product of other wood manufacturing processes Accordingly, the organic fibrous material may be considered to be part of the waste stream of a manufacturing facility. Using this raw material provides significant benefits to the raw material costs of sheets manufactured from the raw materials. As such, the manufacture of the doors in accordance is more environmentally friendly because it does not require cutting down additional trees for the formation of the panels. Additionally, the sheets from which the door facings are manufactured are also constructed using relatively low cost and high heat resistant thermoplastic polymers such as polypropylene. Finally, door facings are constructed using relatively low cost thermoforming manufacturing techniques such as vacuum forming and compression molding.

In accordance with the present invention, the exterior surface of the facings may not be stained or painted. Instead, it is contemplated that a thin layer of plastic material may be applied to the thin sheet of the composite material to form the exterior surface of the same. The thin layer of plastic material may be applied one or more ways. It is contemplated that the thin layer of plastic material may be coextruded with the composite mixture. After the coextrusion operation, the thin sheet and the thin layer are thermoformed to form an exterior three dimensional door surface. It is also contemplated that the thin layer of plastic material may be applied by laminating a thin layer of plastic material on to the exterior surface of the thin sheet. Prior to lamination, the exterior surface of the thin sheet may be treated to promote adhesion with the thin layer of plastic material. For example, it is contemplated that the exterior surface may be flame treated, exposed to heat or corona treated.

Door facings and door slabs constructed in accordance with the present invention are dimensionally stable in response to temperature variations. As the door facings will undergo a minimum of expansion or contraction, the facings will be less likely to delaminate from a frame. It is also likely that cracking and other forms of deterioration will be minimized for doors constructed in accordance with the present invention. This dimensional stability results in doors that are suitable for use in association with storm doors or as storm doors.

BRIEF DESCRIPTION OF THE DRAWINGS

In the accompanying drawings which form a part of the specification and are to be read in conjunction therewith and in which like reference numerals are used to indicate like parts and wherein.

DETAILED DESCRIPTION OF PREFERRED EMBODIMENTS

Figure 1:
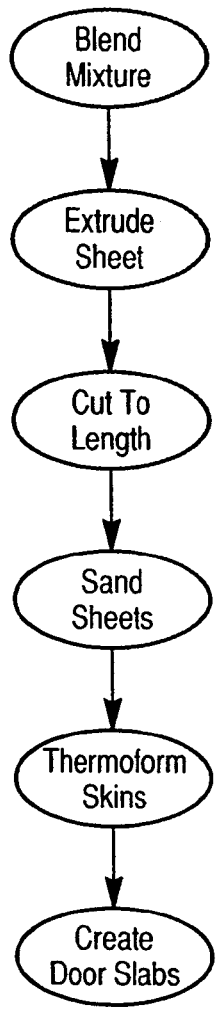
FIG. 1 shows the method of forming a door in accordance with the teachings of the present invention.

FIG. 1 shows the method of forming a door in accordance with the present invention. The method involves mixing together a thermoplastic polymer with an organic fibrous material in a ratio such that the organic fibrous material constitutes 40-60% by weight of the mixture. The organic fibrous material is preferably relatively small particles of pine that have passed through a sieve. For example, an 80 mesh sieve may be used. The present invention is not limited to the use of an 80 mesh sieve; rather, other sizes both larger and smaller are considered to be well within the scope of the present invention. The present invention, however, is not limited to the use of pine; rather, it is contemplated that various types of wood dust including but not limited to oak, cherry, maple and combinations of the same or other woods may be used. It is further contemplated that the use organic fibrous material may contain a blend of wood particles, provided that all of the particles have been passed through the sieve. It is further contemplated that other fibrous organic materials may be used including but not limited to straw, rice husks and knaff. The organic material may contain a mixture of wood and other fibrous organic materials.

The thermoplastic polymer is preferably polypropylene. The polymer is melted and blended with the organic fibrous material either by batch mixing or twin-screw extension to form a homogenous material. The fiber mesh size (preferably 80 mesh) is such that the material has a uniform appearance without obvious particles. It is contemplated that the mixture may include filler materials. For example, ethylene propylene diere monomer (EPDM) may be added to improve impart resistance. Talc powder may be added to increase thermal stability. The presence of talc powder also lightens the color of the extruded mixture.

In accordance with the present invention, it is preferable that the mixture includes a coupling agent. The presence of the coupling agent increases the adhesion between the components of the mixture. The coupling agent is a maleated polypropylene. The present invention, however, is not limited to the use of a maleated polypropylene; rather, other materials that can improve the adhesion of the components of the mixture are considered to be well within the scope of the present invention. The coupling agent constitutes between 0.5 to 5 percent by weight off the mixture.

The mixture is then extruded into sheets of thickness preferably between 2 to 4 mm. The sheets are extruded at appropriate widths and cut to appropriate lengths for various door sizes.

The sheets undergo a material removal process which is preferably sanding, so as to expose the fibrous material within the extended sheets. Preferably the sanding removes material from at least one surface of the sheet. The removal of material through sanding imparts a homogenous appearance to that surface that is devoid of obvious fibrous particles. The sheets are sanded so that the sanded surface may readily accept paint, stain or ink.

The sheets are then thermoformed preferably through vacuum forming. The sheets may also be thermoformed through compression molding with matched tooling. The thermoforming imparts a three-dimensional door surface on the sheet, thus creating a thin door facing from the sheet. A grain pattern may be imparted on the sanded surface if desired preferably through imprinting the wood grain pattern on the sanded surface.

Figure 2:
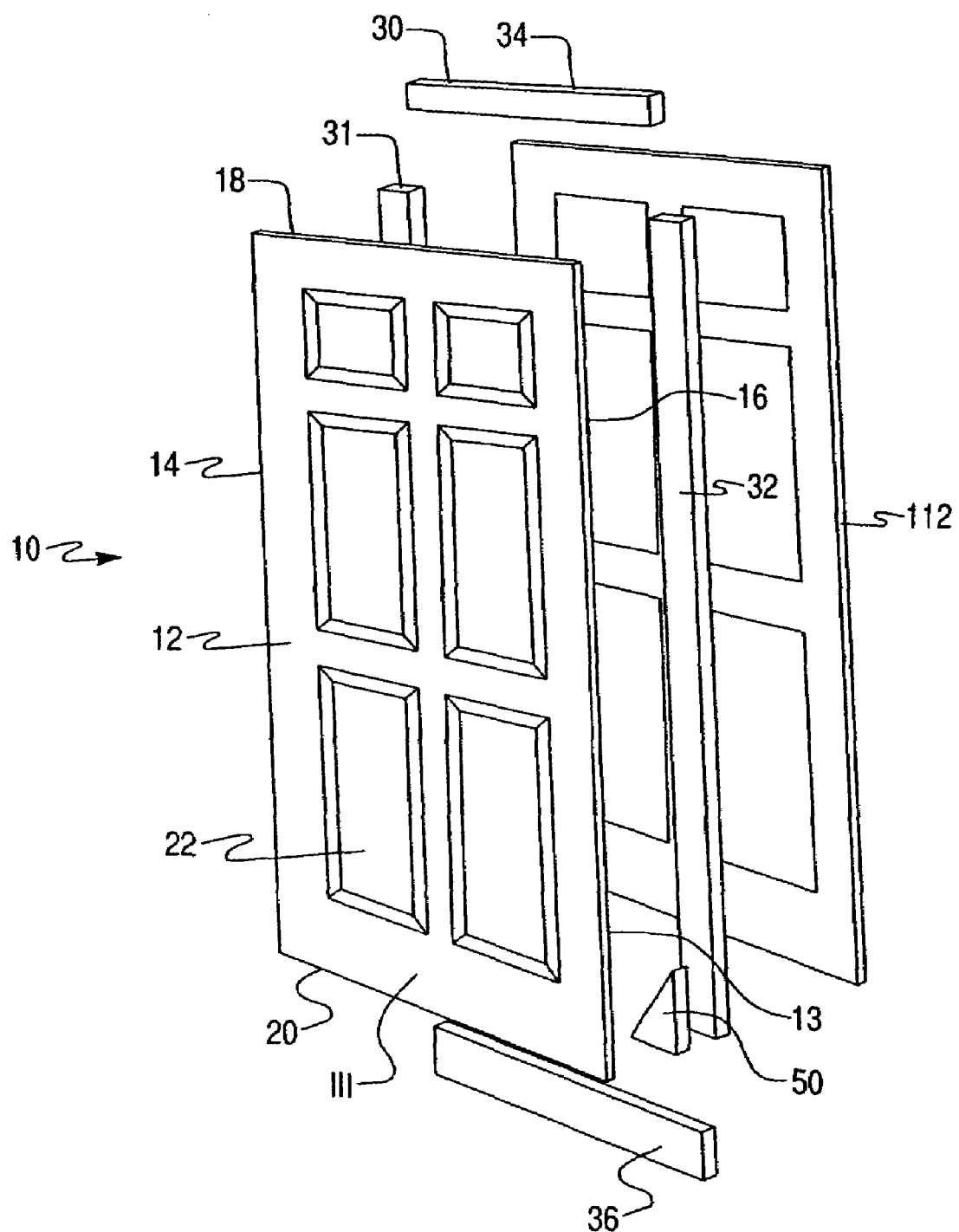
FIG. 2 is an exploded view showing a door constructed in accordance with the teachings of the present invention.

As is shown in FIG. 2, a door assembly 10 is then created through the use of two door facings 111 and 112. The door assembly shown in FIG. 2 includes a first door facing 111 and a second door facing 112. The first door facing 111 includes a front surface 12 which is a sanded surface, and a back surface 13 opposite the front surface. The first door facing 111 further includes a first side edge 14, a second side edge 16, a top edge 18, and a bottom edge 20. The first and second side edges 14 and 16 are preferably parallel to each other. The distance between the first and second side edges 14 and 16 defines the width of the facing 111. The top edge 18 and the bottom edge 20 are also preferably parallel to each other. The distance between the top edge 18 and the bottom edge 20 defines the length of the facing 111. A plurality of simulated wood panels 22 have been formed into the facing 111. The second facing 112 is preferably similarly constructed to the first facing 111. The second facing 112 preferably includes a sanded surface facing in the opposite direction from the sanded surface 12 of the first facing 111. The first and second door facings 111 and 112 are attached to a peripheral frame 30 in a substantially parallel relationship to each other. The peripheral frame 30 includes a first vertical frame element 31, a second vertical frame element 32, a top frame element 34, and a bottom frame element 36. The frame elements 31, 32, 34, and 36 could be manufactured from a variety of materials such as wood, or could be manufactured from a composite material similar to the material used in the door facings 111 and 112. The frame 30 is shown in a preferred configuration or a rectangle. The door 10 is filled with a core material 50, only a portion of which is shown in FIG. 2. The preferred core material is a good insulating material. The use of a polyurethane foam provided better energy efficiency. The core material would preferably fill the entire cavity between the facings 111 and 112 cavity within the frame 30. It is contemplated that the core material may be provided as a preformed insert. It is also contemplated that the core material may be formed in place between the facings 111 and 112.

The facings 111 and 112 simulate the appearance of a multiple paralleled wood door having eight simulated wood panels 22. However, it is understood that the preferred configuration shown in FIG. 2 is one of many configurations possible. It is also understood that a simulated wood grain could also have been imparted into the sheet prior to or after thermoforming such a wood grain would preferably be imprinted into the sheet. It is further understood that the sanded or abraded surface of the door facing will readily accept paint, stain, ink and other coatings or finishes, which might enhance the appearance of the door. It is further understood that the inner surfaces of the facings 111 and 112 may be abraded to enhance the adhesion with the core material, described above, and/or the adhesive used to secure the door components together. Although the abraded surface is devoid of obvious particles of organic fibrous materials, the organic fibrous particles exposed by the abrading process are able to readily accept paint, stain, ink and other coatings or finishes. It is understood that a material removal process other than sanding could have been used to expose the organic fibrous particles. Other forms of abrading are within the scope of the present invention. It is also contemplated that a corona treatment may be applied to the surfaces of the facings 111 and 112. The treatment may be applied to the outer surface of the facings 111 and 112 to improve paint adhesion. The tread may be applied to the inner surface of the facings 111 and 112 to improve the adhesion with glue and/or foam located within the interior of the door. It is understood that both facings may include a sanded surface that will readily accept paint, stain, ink and other coatings or finishes. However, it is possible that only the first facing would include a sanded surface. It is also understood that both surfaces of each facing could undergo a material removal process. It is also understood the material removal process could be a process other than abrasive sanding. It is further understood that many frame configurations are possible within the scope of the invention. It is still further understood that the use of many different core materials are possible within the scope of the invention.

Figure 3:
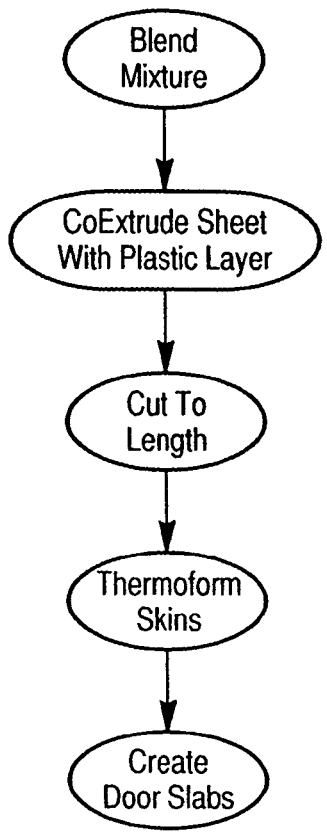
FIG. 3 is a method of forming a composite door in accordance with another embodiment of the present invention.
Figure 5:
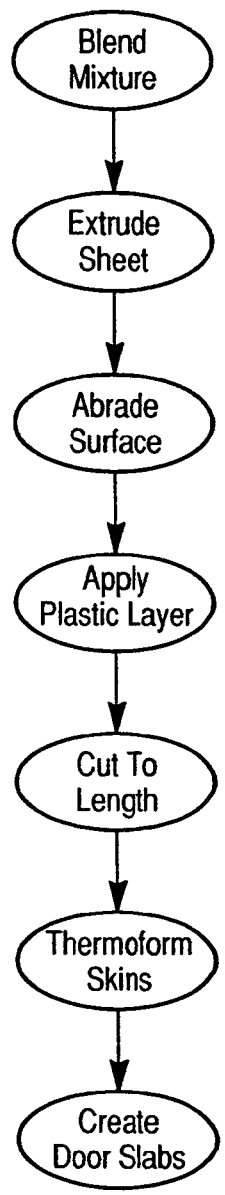
FIG. 5 is a method of forming a composite door in accordance with another embodiment of the present invention.
Figure 4:
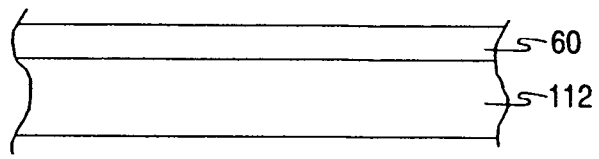
FIG. 4 is a partial schematic diagram illustrating a thin layer of a plastic material formed on the surface of the door facings in accordance with the present invention.

While an advantageous embodiment has been chosen to illustrate the invention, it will be understood by those skilled in the art that various changes and modifications can be made therein without departing from the scope of the invention. For example, the exterior surface of the facings may not be stained or painted. It is contemplated that during the process of forming the sheets, the mixture may be coextruded with a plastic layer 60 that forms a top surface, as set forth in FIG. 3. After the coextrusion operation, the thin sheet 111 or 112 and the thin layer 60 are thermoformed to form an exterior three dimensional door surface. The plastic layer may be formed using ASA plastic 15/1000 or other plastic materials having similar properties. The plastic layer may have a thickness of 0.015" or thinner. It is also contemplated that the plastic layer may have a greater thickness. This coextrusion provides a pre-finished colored surface (e.g. white or tan) that does not require painting and has good UV resistance. No further finishing is required, it is not necessary to perform the above described abrading operation because there is no need to expose wood fibers for purposes of staining. It is also contemplated that the thin layer of plastic material may be applied by laminating a thin layer of plastic material on to the exterior surface of the thin sheet, as illustrated in FIG. 5. Prior to lamination, the exterior surface of the thin sheet may be treated to promote adhesion with the thin layer of plastic material. For example, it is contemplated that the exterior surface may be flame treated or corona treated. It is also contemplated that a sanding or grinding operation may be performed on the facings 111 and 112 to enhance the adhesion of the plastic layer to the top surface. It is also contemplated that the plastic layer may be textural during the thermal forming operation if such a textured finish is desired. It is further contemplated that the facings 111 and 112 may be cut to length before or after the application of the plastic layer 60. It is intended that the present invention covers the modifications and variations of the invention contemplated herein, provided they come within the scope of the appended claims and their equivalents. It is understood that the invention is not to be limited to the disclosed embodiments and elements, but, to the contrary, it is intended to cover various modifications, combinations of features, equivalent arrangements, and equivalent elements.

What is claimed:

1. A method of forming a door comprising:
    forming a peripheral door frame;
    mixing a thermoplastic polymer with an organic fibrous material to form a mixture in a ratio such that the organic fibrous material constitutes 40 to 60 percent by weight of the mixture;
    extruding the mixture under heat and pressure to form a thin sheet;
    cutting the sheet to a predetermined size;
    thermoforming the sheet to impart on at least one surface an exterior three dimensional door surface to define a thin door facing; and
    assembling two of the thermoformed thin door facings, and a peripheral frame into a door in which the two thin door facings are fixedly held in parallel relation by the peripheral frame.

2. The method according to claim 1, wherein the thermoplastic polymer is polypropylene.

3. The method according to claim 1, wherein the organic fibrous material contains wood fiber.

4. The method according to claim 3, wherein the organic fibrous material contains a mixture of wood fiber and other fibrous organic materials.

5. The method according to claim 1, wherein the step of extruding the mixture creates a continuous sheet form having a first pair of opposed parallel edges substantially defining the peripheral width of the thin door facing, wherein the step of cutting the sheet includes cutting the continuous sheet between the first pair of opposed parallel edges to provide the thin door facing with opposed edges defining the height thereof.

6. The method according to claim 1, further comprising:
    removing material from at least one surface of the sheet to create a homogeneous appearance devoid of obvious fibrous particles.

7. The method according to claim 6, wherein the step of removing the material includes sanding the at least one surface.

8. The method according to claim 6, wherein the step of removing the material includes performing a corona treatment on the at least one surface.

9. The method according to claim 1, wherein the step of thermoforming includes vacuum forming.

10. The method according to claim 1, wherein the step of thermoforming includes imparting a wood grain configuration to the at least one surface.

11. The method according to claim 1, wherein the step of thermoforming includes imparting a multiple paneled configuration to the at least one surface.

12. The method according to claim 1, wherein the step of assembling further includes locating a core material in a cavity formed by the two thin door facings and the peripheral frame.

13. The method according to claim 12, further comprising:
    applying an adhesive to an inner surface of each of the door facings to secure the facings to at least one of the peripheral frame and the core material.

14. The method according to claim 13, further comprising:

removing material from the inner surface of each of the door facings prior to applying the adhesive to the inner surfaces.

15. The method according to claim 1, wherein the mixture includes a coupling agent.

16. The method according to claim 15, wherein the coupling agent constitutes 0.5 to 5 percent by weight of the mixture.

17. The method according to claim 1, further comprising:
applying a thin layer of plastic material to the thin sheet to form an exterior surface.

18. The method according to claim 17, wherein applying the thin layer of plastic material includes coextruding a plastic material with the mixture to form a thin layer on the thin sheet.

19. The method according to claim 18, wherein the thin sheet and the thin layer are thermoformed to form an exterior three dimensional door surface.

20. The method according to claim 17, wherein applying the thin layer of plastic material includes laminating a thin layer of plastic material on the thin sheet.

21. The method according to claim 20, further comprising treating an exterior surface of the thin sheet prior to laminating.

22. The method according to, claim 21, wherein treating the exterior surface includes flame treating the exterior surface prior to laminating.

23. A method of forming a door comprising:
mixing a polypropylene with an organic fibrous material to form a mixture;
extruding the mixture under heat and pressure to create a thin sheet form;
cutting the sheet to a predetermined size;
thermoforming the sheet to impart to the at least one surface an exterior three dimensional door surface to define a thin door facing; and
assembling two of the thermoformed thin door facings, and a peripheral frame into a door in which the two thin door facings are fixedly held in parallel relation by the peripheral frame.

24. The method according to claim 23, wherein the organic fibrous material constitutes 40 to 60 percent by weight of the mixture.

25. The method according to claim 24, wherein the mixture includes a coupling agent, wherein the coupling agent constitutes 0.5 to 5 percent by weight of the mixture.

26. The method according to claim 23, wherein the organic fibrous material contains wood fiber.

27. The method according to claim 26, wherein the organic fibrous material contains a mixture of wood fiber and other fibrous organic materials.

28. The method according to claim 23, wherein the step of extruding creates a continuous sheet form having a first pair of opposed parallel edges substantially defining the peripheral width of the thin door facing, and the step of cutting includes cutting the continuous sheet between the first pair of opposed parallel edges to provide the thin door facing with opposed edges defining the height thereof.

29. The method according to claim 28, wherein the step of extruding further comprises:
coextruding a plastic material with the mixture to form a thin layer on the thin sheet.

30. The method according to claim 29, wherein the thin sheet and the thin layer are thermoformed to form an exterior three dimensional door surface.

31. The method according to claim 23, further comprising:
laminating a thin layer of plastic material to the thin sheet to form an exterior surface.

32. The method according to claim 31, further comprising treating an exterior surface of the thin sheet prior to laminating.

33. The method according to claim 23, further comprising:
removing material from at least one surface of the sheet to create a homogeneous appearance devoid of obvious fibrous particles.

34. The method according to claim 33, wherein the step of removing material includes sanding the at least one surface.

35. The method according to claim 33, wherein the step of removing the material includes forming a corona treatment on the at least one surface.

36. The method according to claim 23, wherein the step of thermoforming includes comprises vacuum forming.

37. The method according to claim 23, wherein the step of thermoforming includes imparting a wood grain configuration to the at least one surface.

38. The method according to claim 23, wherein the step of thermoforming includes imparting a multiple paneled configuration to the at least one surface.

39. The method according to claim 23, wherein the step of assembling further includes locating a core material in a cavity formed by the two thin door facings and the peripheral frame.

* * * * *